United States Patent
Karl et al.

(10) Patent No.: US 6,590,399 B1
(45) Date of Patent: Jul. 8, 2003

(54) MEASURING PARAMETERS OF DUT AT SPECIFIED FREQUENCY USING VECTOR NETWORK ANALYZER

(75) Inventors: Eric Branden Karl, Morgan Hill, CA (US); Yuenie Lau, San Jose, CA (US)

(73) Assignee: Anritsu Company, Morgan Hill, CA (US)

(*) Notice: Subject to any disclaimer, the term of this patent is extended or adjusted under 35 U.S.C. 154(b) by 0 days.

(21) Appl. No.: 09/560,050

(22) Filed: Apr. 27, 2000

Related U.S. Application Data

(60) Provisional application No. 60/131,132, filed on Apr. 27, 1999.

(51) Int. Cl.$^7$ .................. G01R 27/28; G01R 23/00; G01R 13/00
(52) U.S. Cl. ............. 324/637; 324/639; 324/642; 324/76.41
(58) Field of Search ............. 324/76.41, 76.47, 324/76.52, 76.56, 637, 638, 639, 642, 645, 76.11

(56) References Cited

U.S. PATENT DOCUMENTS

| | | | | | |
|---|---|---|---|---|---|
| 3,783,389 A | * | 1/1974 | Gutleber | ............... | 327/113 |
| 5,072,189 A | * | 12/1991 | Openlander | ............... | 324/638 |
| 5,748,000 A | * | 5/1998 | Blackham | ............... | 324/601 |
| 6,163,158 A | * | 12/2000 | Moeller et al. | ............... | 324/633 |

* cited by examiner

Primary Examiner—Kamand Cuneo
Assistant Examiner—Paresh Patel
(74) Attorney, Agent, or Firm—Fliesler Dubb Meyer & Lovejoy LLP

(57) ABSTRACT

A method for taking measurements using a vector network analyzer (VNA) enables a reduction in interference created when the VNA is operated in the presence of external signals. For the method, three measurements are taken, one at a desired measurement frequency, another at a frequency slightly less than the desired measurement frequency, and another at a slightly greater frequency than the desired measurement frequency. An interfering signal may occur at or near the frequency of one of the three measurements. To eliminate measurement error from the interfering signal, the measurement signal with the median, or middle, magnitude is selected to provide the measurement results.

6 Claims, 6 Drawing Sheets

MEASURING PARAMETERS OF DUT AT SPECIFIED FREQUENCY USING VECTOR NETWORK ANALYZER

CROSS-REFERENCE TO RELATED APPLICATION

This application claims the benefit of U.S. Provisional Application No. 60/131,132, filed Apr. 27, 1999.

BACKGROUND OF THE INVENTION

1. Field of the Invention

The present invention relates to a configuration for a handheld vector network analyzer (VNA) to enable improved operation in the presence of external signals.

2. Description of the Related Art

Wireless communications networks such as cellular telephones or personal communication services (PCS) telephones require remotely located antennas or "cells" to provide services to individual users. To reduce service costs for the remote cell site, it is desirable to test the microwave components of the cell site at its remote location and locate and repair portions which fail.

A VNA can be used to test for component malfunctions at cell sites. As illustrated in FIG. 1, a VNA operates by sending out a signal on its test port and then measuring the reflected signal on the same port. The incident and reflected signals are then downconverted, and a magnitude and phase of the reflected signal relative to the incident signal are displayed as measurement results.

VNAs enable a user to easily identify a fault in a cell site component and to measure the distance from the test device to a fault or discontinuity. A fault may result from environmental conditions such as corrosion of a connector, or from faulty installation or repair. Test measurements are first typically made using a VNA operating in the frequency domain to determine whether a fault exists as indicated by an undesirable standing wave ratio (SWR). If a fault is discovered, an analysis of the results derived from the frequency domain measurement is made in the time domain to locate the position of the fault.

A VNA also enables calibration to extend the test port connection to the end of a cable connected to the test port by accounting for any phase and amplitude differences. By using a VNA to extend the test port to the end of the cable, errors in the cable will not be taken into account when measuring a device through the cable.

Because a remote cell site may be constantly providing signals for communications devices once it is installed, it is desirable that the cell site not be disabled for testing. By measuring both phase and amplitude, a VNA can include components to enable extraneous signals to be distinguished and their affects minimized, enabling tests to be performed with the remote cell site active.

Many VNAs are large and not easily transportable. For instance, VNAs such as the HP 8510 manufactured by Hewlett Packard, have a housing greater than two feet on a side and a power supply weighing 50 pounds or more. Such VNAs are difficult to transport to remote facilities where cell cites for cellular telephones and PCS telephones are located.

More recently Anritsu Company of Morgan Hill Calif. has manufactured a Sitemaster VNA, which is a handheld device with dimensions on the order of 8 inches by 6 inches by 2½ inches, which weighs on the order of 3 pounds. One version of the Sitemaster has components described in U.S. Pat. No. 5,642,039 entitled "Handheld Vector Network Analyzer", which is incorporated herein by reference. Other versions of the Sitemaster VNA are described in the following U.S. Patent Applications: U.S. patent application Ser. No. 08/865,882, entitled Two Port Handheld Vector Network Analyzer With Frequency Monitor Mode", filed May 30, 1997 and incorporated herein by reference; and U.S. patent application Ser. No. 08/957,261, entitled "Handheld Vector Network Analyzer (VNA) Operating At A High Frequency By Mixing LO and RF Signals Having Offset Odd Harmonics", filed Oct. 4, 1997 and incorporated herein by reference.

With a limited size and weight, Sitemaster VNAs provide a VNA which is easily transported and used at remote cell cites. Embodiments of the Sitemaster VNA, as described in U.S. Pat. No. 5,642,039 referenced above, include specialized analog components to reduce interference created by signals external to the system being tested.

SUMMARY OF THE INVENTION

In accordance with the present invention, a VNA measurement method is disclosed enabling increased immunity to interference created when the VNA is operated in the presence of external signals.

In accordance with the measurement method of the present invention, three measurements are first taken, one at a desired measurement frequency, another at a frequency slightly less than the desired measurement frequency, and another at a slightly greater frequency than the desired measurement frequency. An external signal at a particular frequency will interfere to a greater extent with one of the three measurements ag opposed to the other two. To eliminate measurement error resulting from the interfering signal, the measurement signal with the median, or middle, magnitude is selected to provide the measurement results.

The method of the present invention can be used alone or in conjunction with the analog system described in U.S. Pat. No. 5,642,039 to help reduce interference created by external signals.

BRIEF DESCRIPTION OF THE DRAWINGS

Further details of the present invention are explained with the help of the attached drawings in which.

DETAILED DESCRIPTION

The present invention increases immunity to interference from external signals when making measurements with a VNA by taking multiple measurements around the desired measurement frequency and choosing a measurement with minimal interference.

Figure 2:
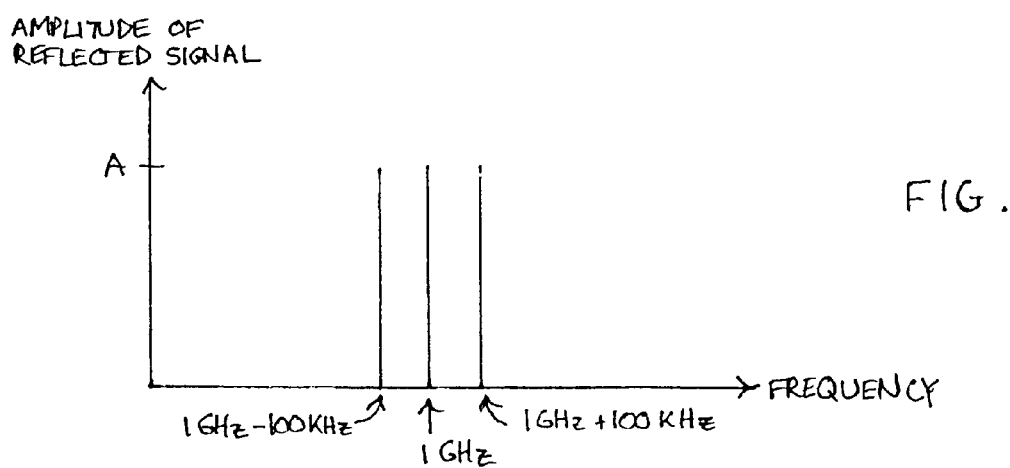
FIG. 2 is a frequency vs. amplitude plot for three test measurements without an interfering signal present.
Figure 3:
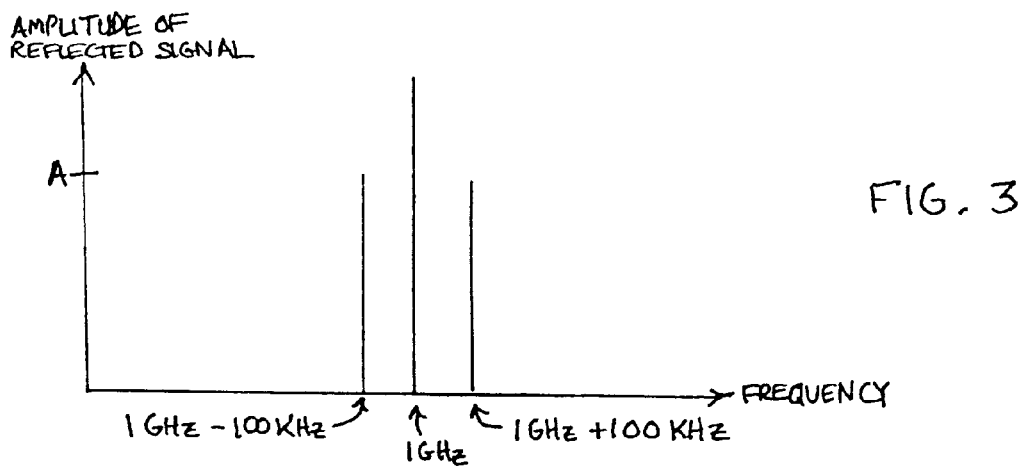
FIG. 3 is a frequency vs. amplitude plot for three test measurements with an interfering signal at 1 GHz present.

As an example, if a measurement is desired at 1 GHz, a measurement method in accordance with the present invention might take 3 measurements, one at 1 GHz−100 KHz, one at 1 GHz, and one at 1 GHz+100 KHz. A frequency vs. amplitude plot of these measurements is illustrated in FIG. 2 with no interfering signals present. FIG. 3 shows a frequency vs. amplitude plot of the three measurements with an interfering signal at 1 GHz.

Figure 1:
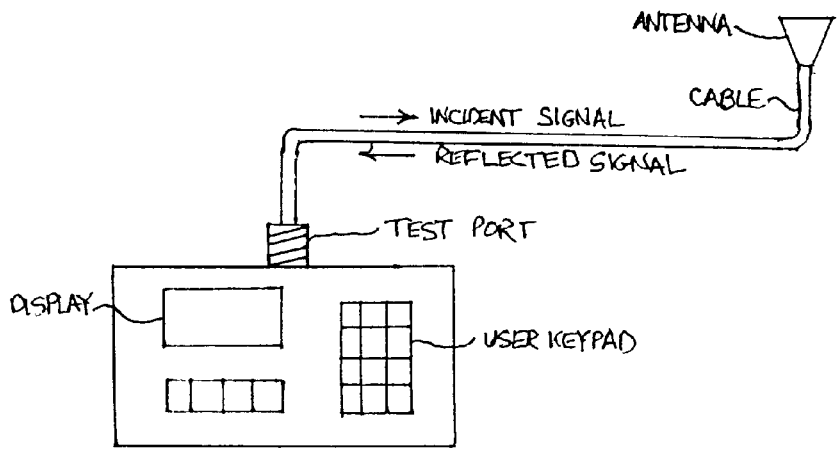
FIG. 1 illustrates operation of a VNA.

By comparing the measurements of FIGS. 1 and 2, it is easy to determine that one of the three measurements has been corrupted by interference. When an interfering signal corrupts one of the test measurements, its amplitude will increase when interference is constructive (as with the 1 GHz signal in FIG. 2) or the amplitude will decrease when interference is destructive.

The measurement method in accordance with the present invention provides discrimination against the measurement where interference occurs. The method uses the measurement with the median, or middle, magnitude of the three measurements as the true measurement value. Assuming the magnitude of three measurements made are related as follows:

MEASUREMENT 1<MEASUREMENT 2<MEASUREMENT 3

The method would use measurement 2 for the true measurement value.

Although the median value chosen is selected by signal magnitude, a VNA provides phase measurements as well. The phase for the measurement with the median magnitude value is also chosen as the true phase measurement. Because an interfering signal can cause phase as well as amplitude errors, selection of a measurement without an interfering component according to amplitude will reduce phase errors as well.

Selection of a frequency offset for the measurements above and below the desired frequency measurement is done according to the present invention to minimize measurement error. Measurement errors from a slightly higher or lower frequency than desired will provide amplitude and phase errors. The greater the offset, the more the amplitude and phase error. But, with a lesser offset, an interfering signal will be more likely to interfere with all three measurements. The offset is, thus, chosen to make the VNA immune to interfering signals while minimizing magnitude and phase errors resulting from the offset. In the example illustrated with respect to FIGS. 1 and 2, the offset is chosen as ±100 parts per million (ppm). With a ±100 ppm offset, and a 5 MHz signal desired, the frequency offset for the two additional measurements would be ±500 Hz. Although a ±100 ppm offset is chosen, different offsets may be chosen as desired.

Figure 4:
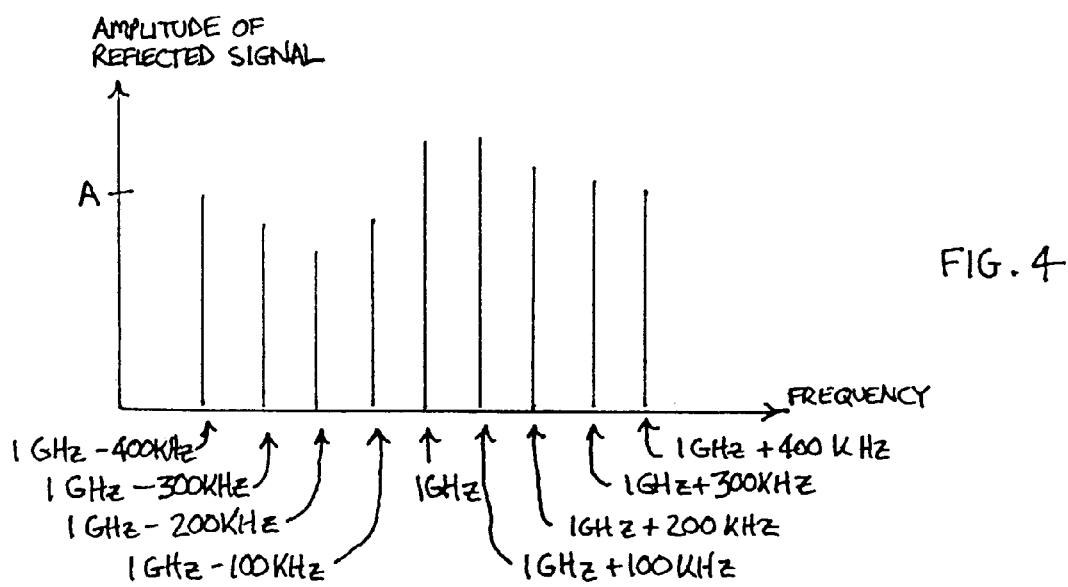
FIG. 4 is a frequency vs. amplitude plot for nine test measurements with a signal interfering with a number of the measurements.

Although in the method described above three measurements are taken, more than three measurements can also be made. FIG. 4 illustrates taking 9 measurements with 4 above and 4 below the desired frequency of 1 GHz. In FIG. 4, an interfering signal occurs at 1 GHz and has a bandwidth of ±300 KHz. As shown, some of the signal components interfere constructively to increase amplitude and some interfere destructively to decrease amplitude. The median magnitude measurement is selected from the 9 measurements to provide the true measurement result. In the case of FIG. 4, the median magnitude measurement is at the frequency 1 GHz−400 KHz. If the magnitude of several measurements around the median measurement are substantially the same, the measurement with a frequency nearest the desired measurement frequency may be chosen to provide the true measurement for the method of the present invention to reduce offset errors.

Figure 5:
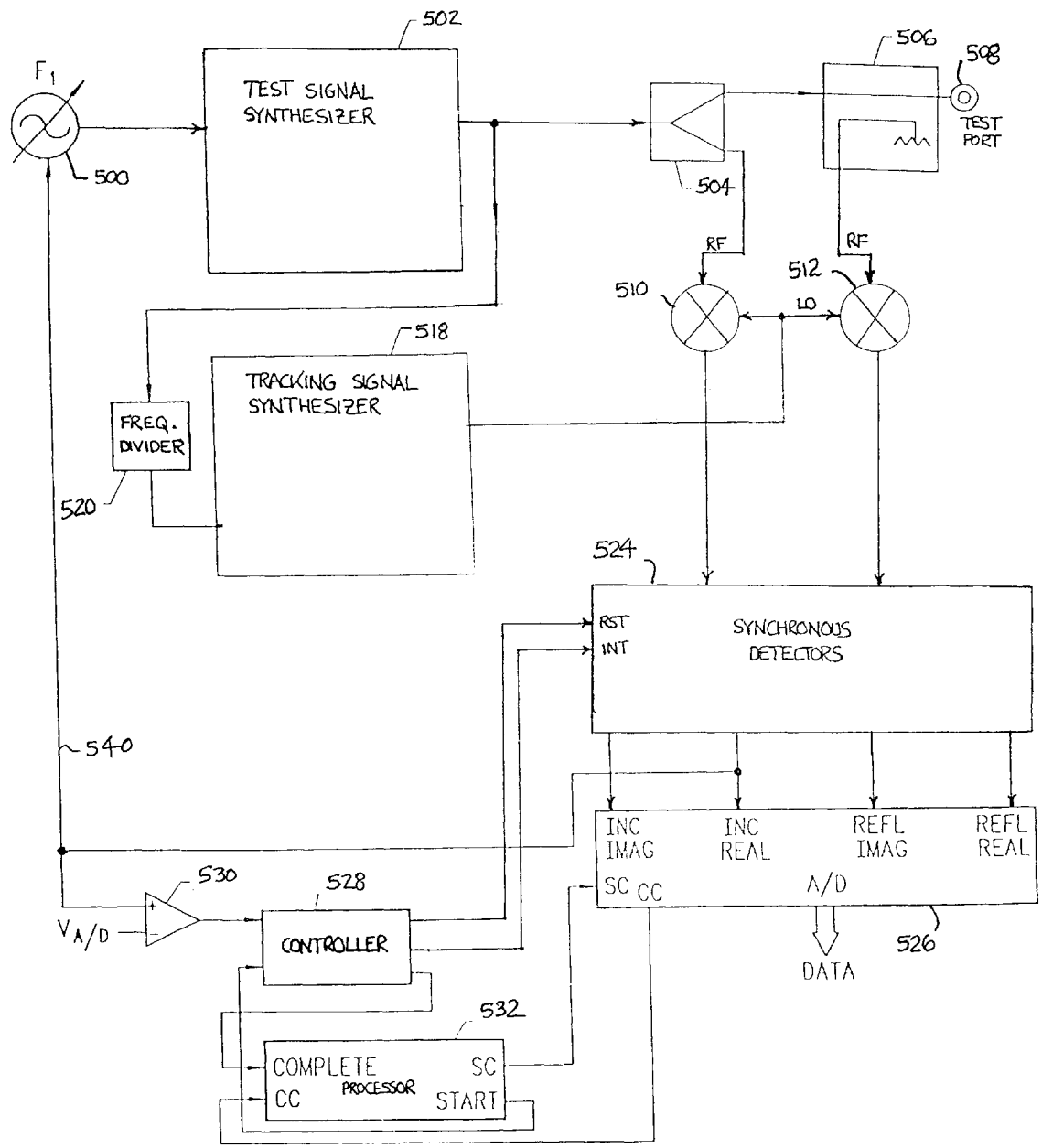
FIG. 5 shows a block diagram of circuitry for a VNA with analog components to reduce interference from external signals.

The method of the present invention can be used alone, or in conjunction with the analog system described in U.S. Pat. No. 5,642,039 to reduce interference created by external signals. FIG. 5 shows a block diagram of components of a handheld VNA including analog components from U.S. Pat. No. 5,642,039 to reduce interference created by external signals. The circuit of FIG. 5 includes a reference oscillator 500 which provides a signal to a test signal generator 502. The test signal generator 502 upconverts the frequency of a signal from the reference oscillator 500 to provide an RF test signal to power divider 504. The power divider 504 has one output providing a portion of the RF test signal through a coupler 506 to a test port 508 of the VNA. The power divider 504 also provides a portion of the RF signal to a first input of mixer 510 as an incident RF signal. A signal reflected from a device connected to the test port 508 is coupled by coupler 506 to a first input of mixer 512 as a reflected RF signal.

A tracking signal synthesizer 518 has an input referenced to the RF signal from the test signal synthesizer 502 through a frequency divider 520. The tracking signal synthesizer 518 then provides a local oscillator (LO) signal to second inputs of mixers 510 and 512. The output of mixer 510 provides an incident intermediate frequency (IF) signal to a synchronous detectors 524, while the mixer 512 provides a reflected IF signal to the synchronous detectors 524.

The synchronous detectors 524 include components for further downconverting the IF signals and separating real and imaginary parts for the signals. Outputs of the synchronous detectors 524 are provided through integrators to generate incident imaginary (INC IMAG), incident real (INC REAL), reflected imaginary (REFL IMAG) and reflected real (REFL REAL) signal components for providing to an A/D converter 526.

The synchronous detectors 524 are controlled so that the incident imaginary signal is at a reference level of 0 volts. Integrators of the synchronous detectors 524 are reset by a signal (RST) from a controller 528 before each measurement and then an integrate pulse (INT) is provided by the controller 528 to start integration. To assure the full operation range of A/D converter 526, the incident real output of the synchronous detectors 524 is provided to a positive input of a comparator 530. Full operation range of the A/D converter is obtained by connecting the negative input of comparator 530 to a voltage reference set at the maximum voltage of the A/D converter, $V_{A/D}$. The output of comparator 530 is supplied to control circuitry 528 which will provide a COMPLETE signal upon transition of the comparator output.

Figure 6:
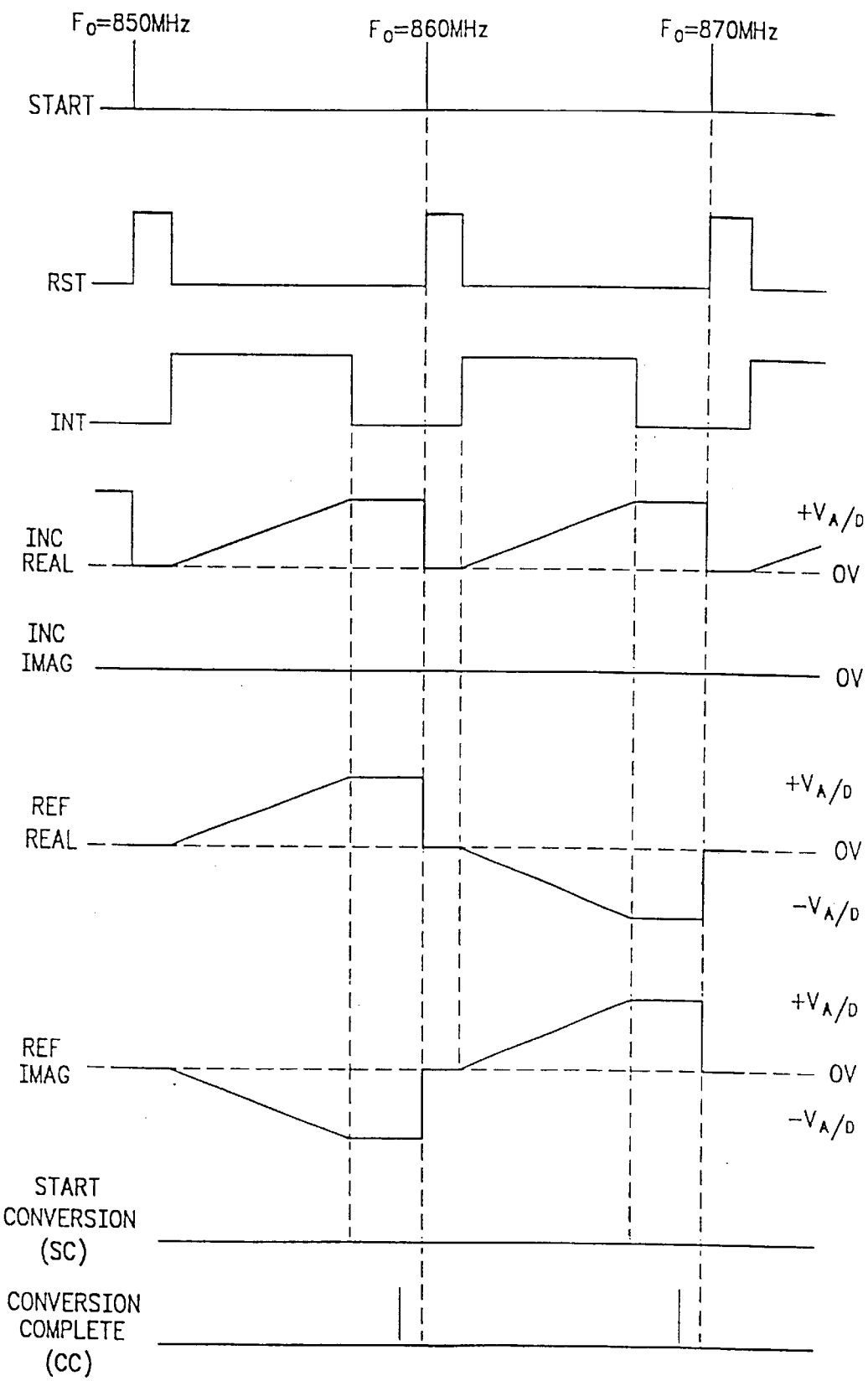
FIG. 6 shows signals received and produced by components of FIG. 5.

Further operation is described with reference to the signals shown in FIG. 6. FIG. 6 shows three START signals generated from processor 532 for measurements with test signals generated at 850, 860 and 870 MHz. Upon receipt of each start signal, controller 528 generates a reset signal (RST) to discharge the integrators of the synchronous detectors 524 so that the integrators will have an initial value of 0V provided to each A/D converter input. Further, on the trailing edge of each RST pulse, a integrate pulse (INT) is generated by controller 528 to start the integrators of the synchronous detectors 524.

The incident imaginary signal (INC IMAG) provided to the A/D converter 526 is at 0V. With INC IMAG set to 0V, the incident real (INC REAL) signal will obtain its maximum value and will rise toward the maximum voltage $V_{A/D}$ of the A/D converter 526. Once $V_{A/D}$ is reached, comparator 530 provides a signal to controller 528 to turn off the INT signal and provide the COMPLETE signal to processor 532. The processor 532 then sends a start conversion signal (SC) to the A/D converter. Upon completion of conversion, the A/D converter 526 returns a conversion complete (CC) signal causing the processor 532 to send the START signal back to controller 528 so that the next RST signal can be generated and another measurement cycle initiated.

The circuitry of FIG. 5 further includes a dither line 540 connection from the incident real output to a voltage control input of a reference oscillator 500 to enable operation of the VNA in the presence of external signals. The reference oscillator 500 is designed to operate with a offset designated in parts per million (ppm). For example with a 100 ppm offset, if the desired reference frequency is 6 MHz, the offset would be ±600 Hz. With the dither line connected to receive the incident real signal, the reference oscillator 500 will sweep the entire ppm range during each measurement made by the A/D converter 526 due to the INC REAL signal always going from 0V to $+V_{A/D}$.

Figure 7:
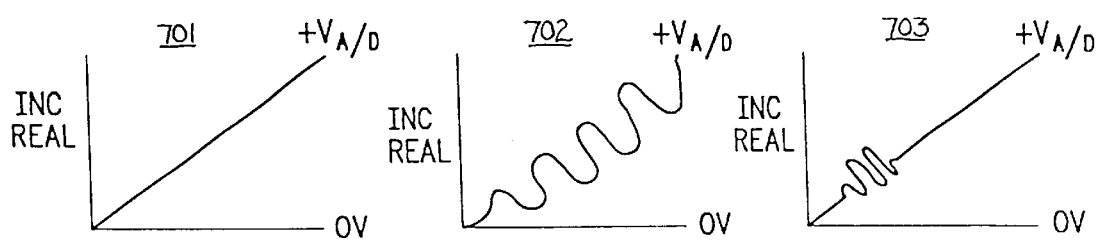
FIG. 7 illustrates operation of the test circuitry of FIG. 5 with and without the dither line connected.

FIG. 7 illustrates operation of the test circuitry of FIG. 5 with and without the dither line 540 connected. Graph 701 shows the INC REAL signal received without receipt of an additional external signal. Graph 702 shows the INC REAL signal received in the presence of an external signal of frequency substantially equal to the test signal with the dither line disconnected. Graph 703 shows the INC REAL signal in the presence of the interfering signal with the dither line connected. As shown, with the dither line sweeping the frequency of reference oscillator 500, interference occurs only in a small range, substantially reducing the possibility of error.

The analog dither line 540 can also be used in combination with the method of the present invention to further reduce errors from interfering signals. By taking measurements at several different frequencies with the dither line connected and choosing only the measurement with the median magnitude value to provide the true measurement results, even the small amount of interference in graph 703 can be eliminated in favor of a signal such as in graph 701 where no interference occurs. To utilize the method of the present invention in conjunction with the dither line, the processor 532 can be programmed to make multiple measurements around a desired frequency. The DATA output form the A/D converter 526 is then analyzed by the processor 532 to determine the measurement with the median magnitude. Only data for the measurement with the median magnitude is then used to provide the true measurement results.

Figure 8:
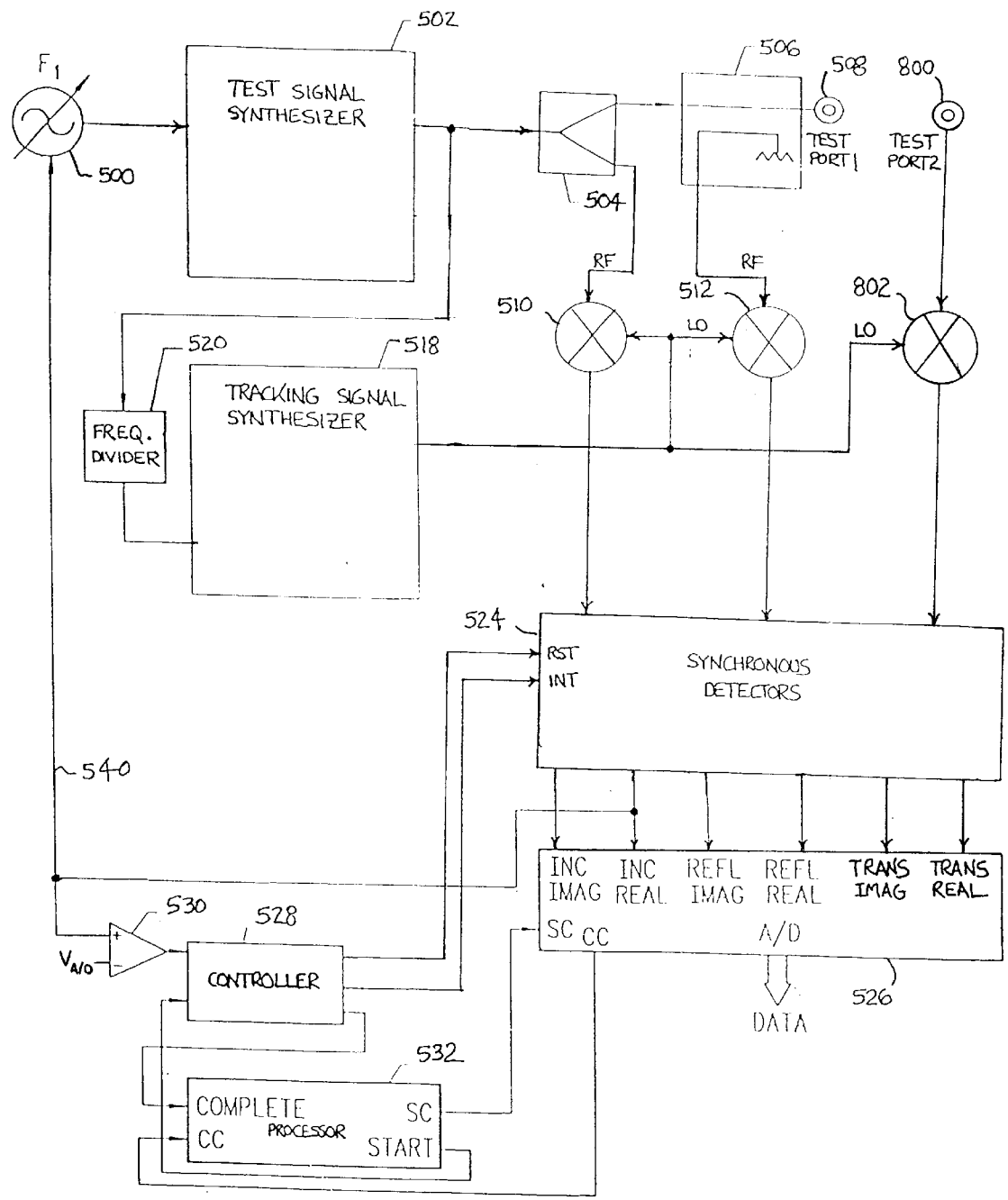
FIG. 8 shows the circuitry of FIG. 5 with additional components included to make two port measurements.

Although FIG. 5 shows a one port device, the method of the present invention might be used with a two port device, such as the two port VNA described in U.S. patent application Ser. No. 08/865,882, referenced previously. FIG. 8 shows the circuitry of FIG. 5 with additional components included to make two port measurements. As shown, the circuit of FIG. 8 includes a second test port 800 connected to an input of an additional mixer 802. The mixer 802 has a second input receiving a LO signal from the tracking signal synthesizer 518. The output of the mixer 802 then provides a transmitted IF signal to the synchronous detectors 524. The synchronous detectors 524 include additional components to downconvert the transmitted IF signal to provide transmitted imaginary (TRANS IMAG) and transmitted real (TRANS REAL) signals to the A/D converter 526.

With a two port device, a test signal can be transmitted from the first port 508 through a test device, and a resulting signal from the test device can be received at the second port 800. By downconverting the signal from test port 800, the resulting parameters of the transmitted signal relative to the incident test signal can be compared, similar to comparison of the incident and reflected signals for the single test port device of FIG. 5.

For example when using the circuit of FIG. 8 when antenna isolation measurements are desired, a first antenna is connected to the first test port 508 and a second antenna is connected to the second test port 800. Noise can result with the second antenna potentially receiving an interfering signal in addition to the signal from the first antenna. By taking multiple measurements and selecting only the measurement with the median magnitude to provide true results according to the present invention, immunity from the interfering signal can be provided. The multiple measurements can be made with or without the dither line 540 connected. The combination of the dither line and the method of the present invention can significantly reduce the affect of interfering signals.

Although the invention has been described above with particularity, this was merely to teach one of ordinary skill in the art how to make and use the invention. Many modifications will fall within the scope of the invention, as that scope is defined by the following claims.

What is claimed is:

1. A method of measuring parameters of a device under test (DUT) at a specified frequency and providing a measurement result using a vector network analyzer (VNA), the method comprising the steps of:
   measuring a magnitude of a first signal reflected from the DUT at the specified frequency;
   measuring a magnitude of a second signal reflected from the DUT at a frequency greater than the specified frequency;
   measuring a magnitude of a third signal reflected from the DUT at a frequency less than the specified frequency;
   providing a median of the magnitude measurements of the first, second and third signals as the measurement result.

2. The method of claim 1 further comprising the steps of:
   measuring a phase for the first, second and third signals; and
   providing the phase measured for one of the first, second and third signals with the median magnitude as part of the measurement result.

3. A method of measuring parameters of a device under test (DUT) at a specified frequency and providing a measurement result using a vector network analyzer (VNA), the method comprising the steps of:
   measuring a magnitude of each of a number of signals reflected from the DUT including a signal substantially at the specified frequency and signals at frequencies near the specified frequency;
   providing a median of the magnitude measurements of the number of signals as the measurement result;
   measuring a phase for the number of signals reflected from the DUT; and
   providing the phase measured for one of the number of signals with the median magnitude as part of the measurement result,
   wherein when more than one of the number of signals has substantially the same magnitude which is the median magnitude, the phase provided as part of the measurement result is the phase of the one of the number of signals with a frequency closest to the specified frequency.

4. A method of measuring parameters of a device under test (DUT) at a specified frequency and providing a measurement result using a vector network analyzer (VNA), the method comprising the steps of:

measuring a magnitude of a first signal transmitted through the DUT at the specified frequency;

measuring a magnitude of a second signal transmitted through the DUT at a frequency greater than the specified frequency;

measuring a magnitude of a third signal transmitted through the DUT at a frequency less than the specified frequency;

providing a median of the magnitude measurements of the first, second and third signals as the measurement result.

5. The method of claim 4 further comprising the steps of:

measuring a phase for the first, second and third signals; and providing the phase measured for one of the first, second and third signals with the median magnitude as part of the measurement result.

6. A method of measuring parameters of a device under test (DUT) at a specified frequency and providing a measurement result using a vector network analyzer (VNA), the method comprising the steps of:

measuring a magnitude of each of a number of signals transmitted through the DUT including a signal substantially at the specified frequency and signals at frequencies near the specified frequency;

providing a median of the magnitude measurements of the number of signals as the measurement result;

measuring a phase for the number of signals reflected from the DUT; and providing the phase measured for one of the number of signals with the median magnitude as part of the measurement result, wherein when more than one of the number of signals has substantially the same magnitude which is the median magnitude, the phase provided as part of the measurement result is the phase of the one of the number of signals with a frequency closest to the specified frequency.

* * * * *